(12) United States Patent
Ramos-Santiago

(10) Patent No.: US 8,020,341 B2
(45) Date of Patent: Sep. 20, 2011

(54) PEST BORDERLINE CONTROL SYSTEM

(76) Inventor: Hector M. Ramos-Santiago, Isabela, PR (US)

( * ) Notice: Subject to any disclaimer, the term of this patent is extended or adjusted under 35 U.S.C. 154(b) by 671 days.

(21) Appl. No.: 12/113,161

(22) Filed: Apr. 30, 2008

(65) Prior Publication Data

US 2009/0272023 A1 Nov. 5, 2009

(51) Int. Cl.
*A01M 7/00* (2006.01)
(52) U.S. Cl. ............. 43/132.1; 43/131; 43/121; 43/107; 52/101
(58) Field of Classification Search .............. 43/132.1, 43/131, 121, 107; 52/101
See application file for complete search history.

(56) References Cited

U.S. PATENT DOCUMENTS

| | | | |
|---|---|---|---|
| 2,012,651 A * | 8/1935 | Beall ........................... 43/124 |
| 2,149,495 A * | 3/1939 | Barnard et al. .................. 52/101 |
| 4,742,641 A | 5/1988 | Cretti |
| 5,170,584 A * | 12/1992 | Perry ........................... 43/124 |
| 5,303,523 A * | 4/1994 | Hand et al. ..................... 52/101 |
| 5,819,466 A | 10/1998 | Aesch et al. |
| 6,463,694 B1 | 10/2002 | Manciet |
| 6,782,655 B2 | 8/2004 | Hoshall |
| 7,748,160 B1 * | 7/2010 | Jordan, Jr. .................... 43/132.1 |
| 7,748,161 B1 * | 7/2010 | Jordan, Jr. .................... 43/132.1 |
| 2002/0139060 A1 * | 10/2002 | Contreras et al. ............... 52/101 |
| 2008/0295446 A1 * | 12/2008 | Kennedy et al. ............ 52/741.3 |

* cited by examiner

*Primary Examiner* — Christopher P Ellis
(74) *Attorney, Agent, or Firm* — Hoglund & Pamias, PSC; Roberto J. Rios; Carla Ferrari-Lugo

(57) ABSTRACT

The present invention provides for a novel, but simply structured pest control system that protects structures such as buildings and humans by providing a system that is selectively attached to the exterior of structures and/or to the surrounding perimeter of structures which creates a physical and chemical barrier where crawling insects and/or pests cannot survive without food and/or exposition to chemical agents such as pesticide. Alternatively the pest control system provides for the possibility that the crawling insects and/or pests agents may abandon the structure without exposition to the chemical agent, thus furthering an ecological homeostasis.

19 Claims, 3 Drawing Sheets

PEST BORDERLINE CONTROL SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates generally to pest control systems, and more particularly, but not by way of limitation, to a pest control system that is attached to the exterior perimeter of structures and/or the surrounding perimeter of structures which creates a chemical barrier for crawling insects and/or pests that access structures from the outside. More particularly the pest control system's design comprises as a recyclable system that allows for the chemical used for extermination to be recycled and/or decomposed without affecting the ground and accordingly the environment.

BACKGROUND OF INVENTION

Pest control is an important safety issue particularly in the health industry and in places prong to plagues due to rodents and/or insects. Roaches, rats, mice, spiders, termites, fleas, ants, and bees, few people welcome them into their homes or offices. Unwanted creatures that infest households, buildings, or surrounding areas are pests that can pose serious risks to human health and safety. It is a pest control worker's job to eliminate them through methods like extermination. However, extermination also poses risks to health most importantly around infants and children whose developing bodies may be especially sensitive to pesticide exposure.

Numerous systems have been proposed to protect buildings and homes from damage caused by pests, and from infections to humans due to insects and/or pests. Among these are to pre-treat the soil under the structure with pesticide chemicals during the construction process. This is accomplished by applying a substantial amount of pesticides to the ground. However, these treatments are of a predetermined duration and their effectiveness decreases as time and environmental constraints develop. More so, the problem with methods like this one is the amount of pesticide required to be used which can be harmful to occupants of structures as well as to the environment.

Other systems such as systems which physically penetrate through piercing the walls of structures have been developed but are often costly and time constraint. More so, many of these delivery systems are underground distribution systems whose installation is costly and often difficult.

Notwithstanding the existence of other methods and systems directed at solving pest infestations, they all fail to solve the above mentioned problem in an efficient and economical way. Therefore there is a need for a pest control system that creates a chemical barrier for insects, rodents and/or pests which can be structurally adapted to the outside of existing structures or outside of a structure's perimeter that is economically, easy to install, and environmentally friendly.

SUMMARY OF THE INVENTION

The present invention solves the aforementioned problems by providing a pest control system that is selectively attached to the exterior of structures and/or to the surrounding perimeter of structures that creates a physical and chemical barrier for pests that access a building structure through the outside, wherein pests cannot survive without food and/or are exposed to death through contact with chemical exterminating and/or pesticide agents. This way, pests will not infest a building if they cannot enter it. Because the majority of pests are rodents and crawling insects which invade structures such as homes and commercial buildings through the soil, the most effective way of preventing infestation is by providing a system that creates a physical and chemical barrier between said animals at the structures.

Because pesticides can pose environmental and health risks, the present invention is novel in that it provides a system that further protects a person's health by eliminating the need to exterminate pests from the inside of structures. This is particularly important for children because the system as designed will prevent children from being exposed to pesticides and/or extermination chemicals which will otherwise be used within the structures. Further this system eliminates the need for regular maintenance and reduces exterminator visits because, according to one aspect of the invention, it provides the option to, automatically refill the control system through the automatic pump. Also, the system provides for maintaining an ecological homeostasis because the system is designed to prevent the entrance of crawling insects and/or rodents to the structures by forcing the crawling insect and/or rodent to enter into the lower hollow structure and find its way out to the ground again. Because the animal has de option of exiting the system it helps prevent animal mutations due to the exposure of chemical agents.

To achieve the foregoing and other advantages, the present invention, briefly described, provides a pest control system that is selectively attached to the exterior of structures and/or to the surrounding perimeter of structures that is effective and environmentally friendly. The pest control system is suitable for residential and commercial structures and is selectively mounted to the outside of the structure and/or perimeter of the structure without substantial modification. The pest control system's design comprises as a recyclable system that allows for the chemical used for extermination to be recycled and/or decomposed without affecting the ground and accordingly the environment, including among others: aquifers and rivers. The pest control system is designed to be filled with the corresponding chemical agent according to the user's need, creating a chemical barrier against pests and or infestations.

According to one aspect of the invention, the pest control system is equipped with a pressurized pump which comprises a timer for dispensing the chemical agent according to the specifications which will depend on the user's need, on the type of chemical to be used, and on the concentration and active ingredient of said chemical, among others. The design provides for distribution of the chemical agent along the internal structure of the pest control system in such a way that it maintains the chemical effectiveness constant and unaltered due to changing atmospheric conditions such as rain, heat, wind, among others. The irrigation of the system may be accomplished manually, through an automatic pump, or through a perforated tubing or embed duct, among others. The pest control system is designed to work with any chemical now known or later developed.

More particularly the present invention relates to a pest and/or insect control system that comprises an inferior hollow structure and a superior hollow structure inversely positioned with respect to the other. According to another aspect of the invention said inferior hollow structure could comprise a canal wherein the chemical agent will be contained. The superior hollow structure is positioned atop the inferior hollow structure and is larger than the inferior hollow structure in order to force a crawling insect and/or pest to, when climbing the outer structure wall, fall within the inferior hollow structure wherein the chemical agent will be contained, or alternatively abandon the structure and return to the ground. The pest control system comprises a siding detachably connectable to the superior hollow structure to prevent accumulation of unwanted materials between the superior hollow structure and the structure's wall wherein the pest control system is mounted. The superior and inferior hollow structures are selectively connected at one end of each arc of the hollow structures forming a shell like shape at its cross section, while the other end of the superior hollow structure is mounted on the exterior surface of the structure at a predetermined distance from the soil.

According to another aspect of the invention the pest control system comprises a pump, either manual or automated, selectively mounted at any location within the pest control system or outside at the structure's surface to distribute the chemical agent to be used as an exterminating and/or pesticide agent. The pump being selectively removable to be part of the system which could be coupled to an electrical source to selectively energize the automatic pump.

According to further another aspect of the invention the pest control system comprises a timer as a control means to selectively distribute the chemical exterminating agent according to the user's need.

According to one aspect of the invention the pest control system further comprises means for recovering the chemical agent used as exterminator and/or pesticide through draining, flushing, and or suction means. Said chemical agent can then be recycled and/or disposed off properly.

Numerous objects, features and advantages of the present embodiment of the invention will be readily apparent to those of ordinary skill in the art upon a reading of the following detailed description of presently preferred, but nonetheless illustrative, embodiments of the invention when taken in conjunction with the accompanying drawings. In this respect, it is to be understood that the embodiment of the invention is not limited in its application to the details of construction and to the arrangements of the components set forth in the following description or illustrated in the drawings. The invention is capable of other embodiments and of being practiced and carried out in various ways. For instance, the pest control apparatus may be used as a protector for other types of pest control systems such as an electrical or microwave pest control system. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

BRIEF DESCRIPTION OF THE DRAWINGS

The preferred embodiments of the invention will hereinafter be described in conjunction with the included drawings provided to illustrate and not to limit the invention, wherein like designations denote like elements, and in which.

DETAILED DESCRIPTION OF THE INVENTION

This specification and the accompanying figures disclose the preferred embodiment as example of the invention. The drawings illustrated in the figures are not to scale and are only intended to serve as illustrating examples of the invention. The invention is not intended to be limited to the embodiment illustrated. Numerous modifications, changes, variations, substitutions and equivalents will be apparent to those skilled in the art without departing from the spirit and scope of the present invention.

Figure 1:
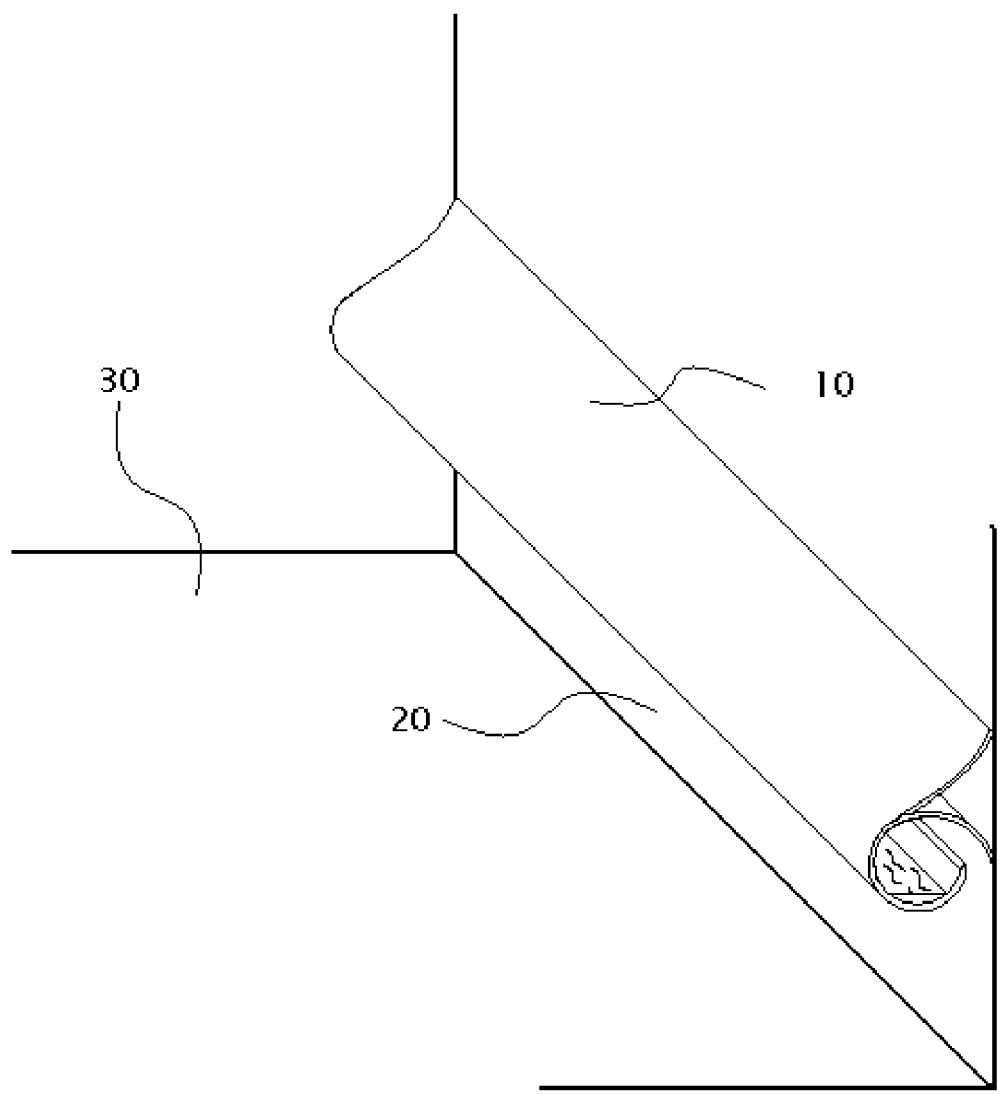
FIG. 1 shows an isometric view of the invention.

Referring now to FIG. 1 the pest control system 10 is shown mounted throughout the perimeter of the external surface of the structure, which in a preferred embodiment comprises a wall 20. Said pest control system is mounted to the wall 20 at a predetermined distance from the ground 30.

Figure 2:
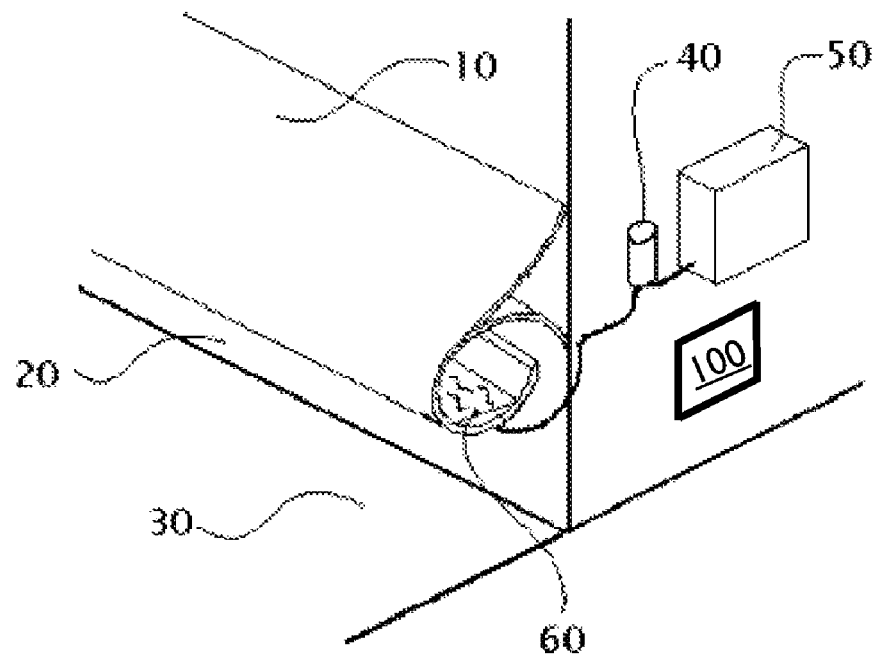
FIG. 2 shows an isometric view of the preferred embodiment of the invention showing the automated pump.

Referring now to FIG. 2 the pest control system 10 is shown. In a preferred embodiment of the invention the chemical agent 60 used to exterminate or as a pesticide is delivered to the pest control system 10 through the use of a pump 40, either manual or automated, selectively mounted at any location within the pest control system 10 or outside at the structure's surface wall 20 to distribute the chemical agent 60 to be used as an exterminating and/or pesticide agent. The pump 40 being selectively removable to be part of the system which could be coupled to an electrical source to selectively energize the automatic pump.

In a preferred embodiment of the invention said pump 40 is automated and it is selectively connected to a reservoir 50 which will contain the chemical agent 60 in order to automatically dispense said chemical agent 60 throughout the pest control system 10. The pump 40 is optionally connected to a timer 100 for dispensing the chemical agent 60 according to the user's specifications which will depend on the user's need, on the type of chemical to be used, and on the concentration and active ingredient of said chemical agent 60, among others. The design provides for distribution of the chemical agent 60 along the internal structure of the pest control system 10 in such a way that it maintains the chemical effectiveness constant and unaltered due to changing atmospheric conditions such as rain, heat, wind, among others. The irrigation of the system may be accomplished manually, through an automatic pump, or through a perforated tubing or embed duct, among others. Additionally the system may include a sensor to determine when the pest containing element needs refill.

Figure 3:
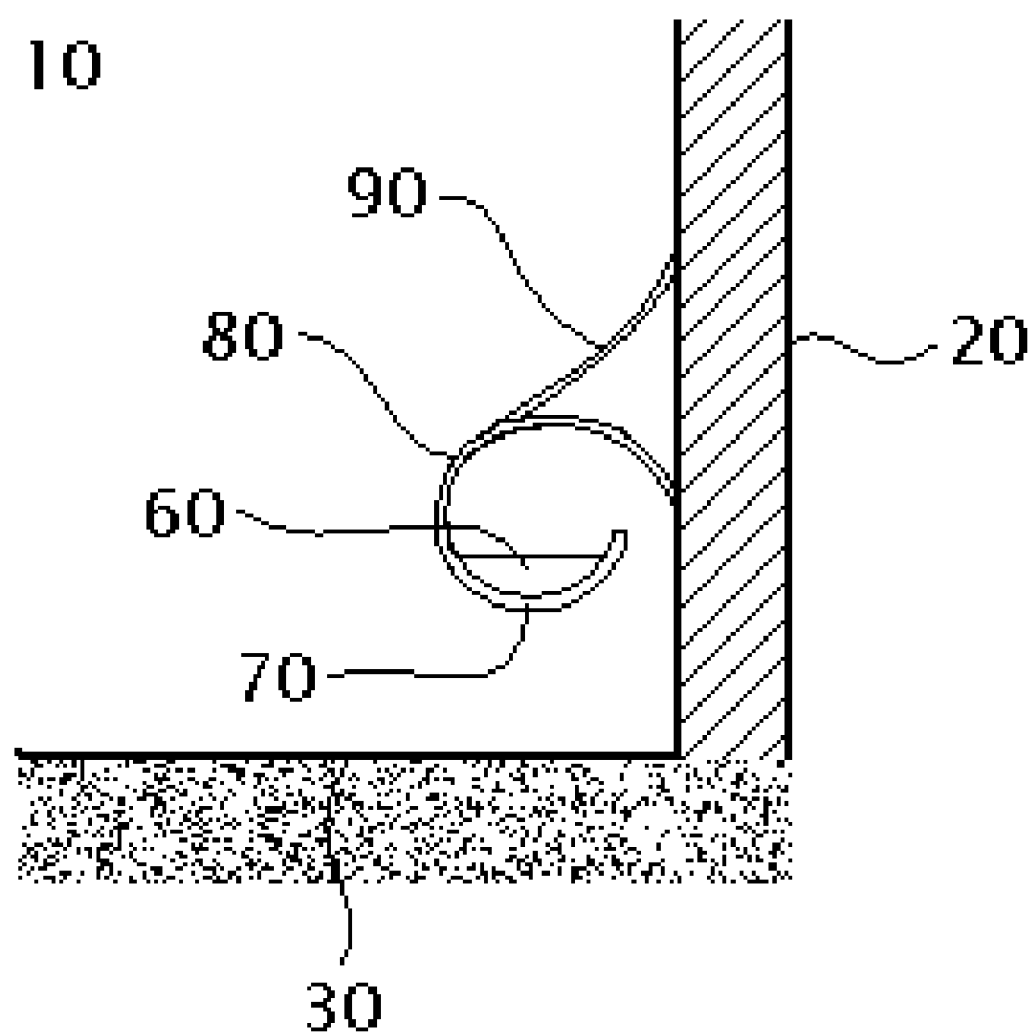
FIG. 3 shows a cross section view of the invention.

Referring now to FIG. 3, the pest control system 10 comprises an inferior hollow structure 70 and a superior hollow structure 80 inversely positioned with respect to the other. In a preferred embodiment of the invention said inferior hollow structure 70 comprises a canal wherein the chemical agent 60 will be contained. The superior hollow structure 80 is positioned atop the inferior hollow structure 70 and is larger than the inferior hollow structure 70 in order to force a crawling insect and/or pest to, when climbing the outer structure wall 20, fall within the inferior hollow structure 70 wherein the chemical agent 60 will be contained, or alternatively abandon the structure and return to the ground 30. The pest control system comprises a siding 90 detachably connectable to the superior hollow structure 80 to prevent accumulation of unwanted materials between the superior hollow structure 80 and the structure wall 20 wherein the pest control system 10 is mounted. The superior hollow structure 80 and inferior hollow structure 70 are selectively connected at one end of each arc of the hollow structures forming a shell like shape at its cross section, while the other end of the superior hollow structure 80 is mounted on the exterior surface of the structure wall 20 at a predetermined distance from the ground 30.

In a preferred embodiment of the invention the pest control system 10 further comprises means for recovering the chemical agent used as exterminator and/or pesticide through draining, flushing, and or suction means. Said chemical agent 60 can then be recycled and/or disposed off properly.

According to one aspect of the invention, the pest control system 10 is made of a material selected from a group comprising at least on of: pvc plastic, metal, fiberglass, or a combination thereof.

While a preferred embodiment of the pest control system 10 has been described in detail, it should be apparent that modifications and variations thereto are possible, all of which fall within the true spirit and scope of the invention. For instance, the pest control apparatus may be used as a protector for other types of pest control systems such as an electrical or microwave pest control system With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

What is claimed is:

1. A pest control apparatus comprising: a containing element; a directing element structurally connected to said containing element; and an opening defined by an end of said containing element, an end of said directing element and a wall surface.

2. The pest control apparatus of claim 1, wherein said directing element is selectively attached to said wall surface.

3. The pest control apparatus of claim 1, wherein said wall surface comprises at least one of: a vertical surface, a horizontal surface, and a diagonal surface.

4. The pest control apparatus of claim 1, wherein said apparatus extends along the periphery of said wall surface.

5. The pest control apparatus of claim 1, further comprising a blocking element removably attached to said directing element.

6. The pest control apparatus of claim 5, wherein said blocking element is removably attached to said wall surface.

7. The pest control apparatus of claim 6, wherein said blocking element is configured to prevent the accumulation of unwanted material between said directing element and said wall surface.

8. The pest control apparatus of claim 1, wherein said wall surface comprises at least one of: an exterior wall, an interior wall, and a ceiling of a structure.

9. The pest control apparatus of claim 1, wherein said apparatus is positioned at a distance above ground level.

10. The pest control apparatus of claim 1, wherein said containing element is configured to hold an anti-pest agent.

11. The pest control apparatus of claim 10, wherein said anti-pest agent comprises at least one of: a repellent composition, an exterminating composition, a pesticide composition, a chemical composition, a liquid, and a solid.

12. The pest control apparatus of claim 1, wherein said directing element is configured to direct pest organisms into said containing element.

13. The pest control apparatus of claim 1, wherein a pest organism enters and exits said pest control apparatus through said opening.

14. The pest control apparatus of claim 1, wherein said directing element is selectively positioned above said containing element.

15. A pest control system comprising the pest control apparatus of claim 1.

16. The pest control system of claim 15, further comprising a delivery means directing an anti-pest agent to said containing element.

17. The pest control system of claim 16, wherein said anti-pest agent is stored in a reservoir element.

18. The pest control system of claim 15, further comprising a control means selectively controlling at least one of: the delivery, recycling and disposing of an anti-pest agent to and from said containing element.

19. The pest control system of claim 18, wherein said control means comprises at least one of a timer, processor or sensor.

* * * * *